United States Patent [19]

Chandler

[11] Patent Number: 5,107,485
[45] Date of Patent: Apr. 21, 1992

[54] DOUBLE SOLENOID FOCUS ACTUATOR FOR OPTICAL RECORDING/PLAYBACK APPARATUS

[75] Inventor: Jasper S. Chandler, Rochester, N.Y.

[73] Assignee: Eastman Kodak Company, Rochester, N.Y.

[21] Appl. No.: 749,509

[22] Filed: Aug. 16, 1991

Related U.S. Application Data

[63] Continuation of Ser. No. 263,441, Oct. 27, 1988, abandoned.

[51] Int. Cl.$^5$ .............................................. G11B 7/09
[52] U.S. Cl. .................... 369/244; 369/44.22; 369/44.21
[58] Field of Search ............... 369/244, 44.21, 44.22, 369/251, 13

[56] References Cited

U.S. PATENT DOCUMENTS

| | | | |
|---|---|---|---|
| 3,946,166 | 3/1976 | Wosidlo | 369/44.22 |
| 4,561,381 | 12/1985 | Janssen et al. | 369/44.22 |
| 4,571,026 | 2/1986 | Maruta | 369/44.21 |
| 4,664,476 | 5/1987 | Kasuga | 369/44.21 |
| 4,782,475 | 11/1988 | Chandler | 369/44.21 |
| 4,817,076 | 3/1989 | Van Sluys et al. | 369/44.21 |

Primary Examiner—William M. Shoop, Jr.
Assistant Examiner—John W. Cabeca
Attorney, Agent, or Firm—William W. Holloway

[57] ABSTRACT

A focus actuator for controlling the focal position of an objective lens used in an optical recording system to maintain a write/read laser beam in focus on a moving optical recording element. In a preferred embodiment, such actuator comprises a pair of juxtaposed coils which concentrically surround a ferromagnetic cylindrical member of low coercivity (e.g. soft iron). The cylindrical member, in turn, is concentrically arranged with respect to the objective lens and is rigidly coupled thereto. When current is applied to one coil or the other, the cylindrical member (and its coupled lens) move along the optical axis of the lens, in one direction or the other, depending on which of the coils is receiving current. Preferably, the cylindrical member is supported for movement within the coils by a pair of flexure blades. A particularly important advantage over similar devices of the prior art is that the focus actuator of the invention requires no permanent magnet.

12 Claims, 2 Drawing Sheets

DOUBLE SOLENOID FOCUS ACTUATOR FOR OPTICAL RECORDING/PLAYBACK APPARATUS

This is a continuation of application Ser. No. 263,441, filed Oct. 27, 1988, now abandoned.

BACKGROUND OF THE INVENTION

This invention relates to improvements in focus actuators, i.e., devices used to control the movement of a lens in a direction parallel to its optical axis to maintain a beam of radiation passing through the lens in sharp focus on a surface moving toward and away from the lens. The present invention is particularly useful in the fields of optical and magneto-optical recording where it is necessary to maintain a read/write laser beam in sharp focus on a spinning disk-shaped recording element.

It is well known in the art how to control the focal position of an objective lens in optical and magneto-optical recording systems with moving coil, moving magnet or moving armature focus actuators. See, for example, the focus actuators disclosed in U.S. Pat. Nos. 4,302,830 and 4,669,823. Such actuators typically comprise one or more permanent magnets which serve to produce a constant magnetic field which, together with a variable magnetic field produced by a varying electrical current (as produced by a focus servo system), controls the lens position relative to a niminal set point. While capable of providing the unerring and precise magnetic field required by high performance actuators, permanent magnets present certain disadvantages. For example, such magnets are expensive and require precision grinding and careful mounting due to their hard and brittle nature. Also, owing to their relatively large mass, moving permanent magnets place an added axial load on the springs used to resiliently mount the objective lens for movement about a nominal set point; this added load requires greater stiffness of the spring and can adversely affect the servo function. Moreover, the continuous magnetic flux between the magnet's pole pieces tends to attract small particles. Such particles are difficult to remove and can eventually alter the response characteristics of the actuator.

SUMMARY OF THE INVENTION

In view of the foregoing, an object of this invention is to provide a high performance focus actuator which employs no permanent magnets.

The focus actuator of the invention comprises a ferromagnetic member of low coercivity, such as a cyclinder of soft iron, which is rigidly coupled to an objective lens. The ferromagnetic member and its coupled lens are movably mounted so that the focal position of the lens along its optical axis can be varied. Movement of the ferromagnetic member and its associated lens along the lens axis is controlled by a pair of electro-magnetic elements, each being closely spaced from the ferromagnetic member, and being responsive to an electrical signal for producing a magnetic field tending to cause the ferromagnetic member to move in a direction so that its coupled lens moves along the lens axis. In response to a first signal, one of the electro-magnetic elements cooperates with the ferromagnetic member to advance the lens in a first direction along the lens axis. In response to a second signal (e.g. of polarity opposite the first signal), the other electro-magnetic element cooperates with the ferromagnetic member to advance the lens in a second direction opposite the first direction. According to a preferred embodiment, each of the electro-magnetic elements comprises an inductance coil, and the ferromagnetic member takes the form of a hollow cylinder of soft iron which is concentrically arranged with respect to the objective lens. The two coils concentrically surround and are closely spaced from the ferromagnetic cylindrical member. Electrical signals are alternately applied to the respective coils to control the position of the ferromagnetic cylinder and its coupled lens along the lens axis. In effect, the actuator of the invention behaves as a pair of solenoids mounted back-to-back with the movably mounted ferromagnetic member as a shared plunger.

The invention will be better understood from the ensuing detailed description of preferred embodiments, reference being made to the accompanying drawings.

DETAILED DESCRIPTION OF PREFERRED EMBODIMENTS

Figure 1:
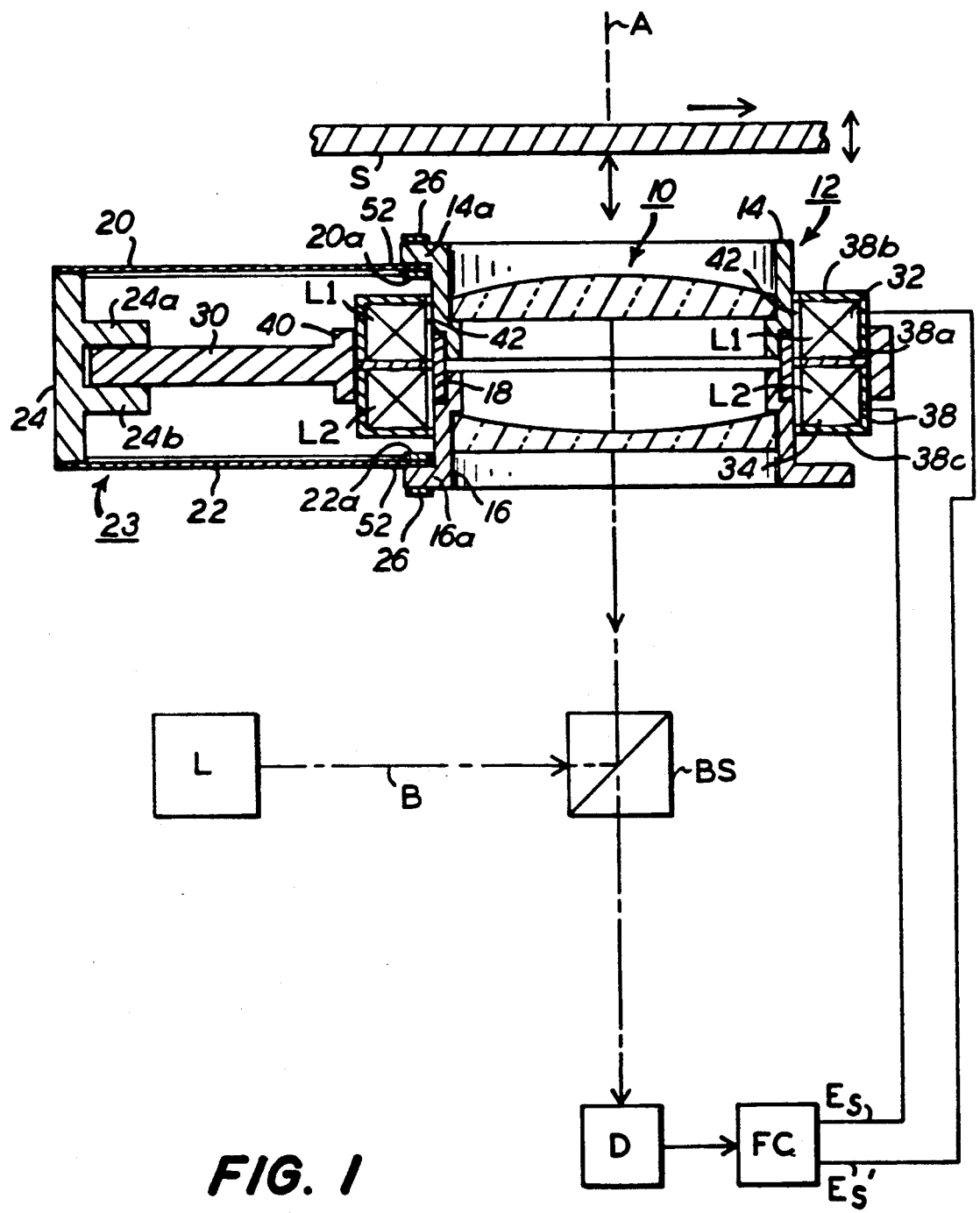
FIG. 1 is a cross-sectional schematic view of a focus actuator embodying the invention.

FIG. 1 is a schematic illustration of a focus control system embodying a preferred form of the focus actuator of the invention. Such system comprises a laser L for producing a beam of radiation B which is deflected by a beam splitter BS toward a moving surface S, for example, the surface of an optical or magneto-optical disk. Surface S moves both perpendicular and parallel to beam B, as denoted by the arrows. The laser beam is focused on surface S by an objective lens 10 which is supported in a cylindrical lens housing 12 defined by a pair of concentric tubular members 14 and 16. Each of the tubular members has an internal reference surface for supporting an optical element, lens 10 being shown as a doublet comprising plano-convex and plano-concave elements. Tubular members 14 and 16 are connected by a cylindrically shaped member 18 which, for reasons to become evident below, is made of a ferromagnetic material of low coercivity, preferably soft iron. The material of member 18 must be capable of readily conducting magnetic flux when subjected to a magnetic field without becoming permanently magnetized when romoved from such field.

Figure 3:
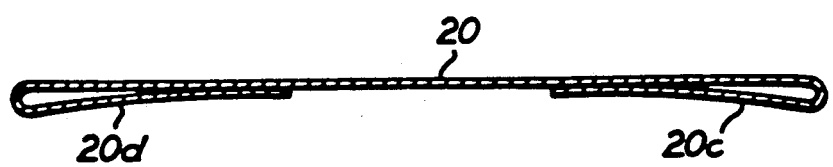
FIG. 3 is a sectional view taken along the section lines 3—3 of FIG. 2.

Lens housing 12 and its associated ferromagnetic cylinder 18 are supported for movement along the lens axis A by a pair of flat springs 20, 22, each having a cross-section as shown in FIG. 3. Springs 20 and 22 may be formed from a single sheet of spring stock 23 (e.g. 0.0125 mm stainless steel spring stock) which is wrapped around and bonded to a support member 24. The free ends 20a and 22a of the flat springs are affixed to flanges 14a and 16a, respectively, of the tubular lens-supporting members 14 and 16. In addition to being adhesively bonded to such flanges, the free ends of the flat springs are held in place by a pair of metal bands 26 which are wrapped around each of the flanges 14a and 16a. Longitudinal stiffness of each of the flat springs is enhanced by folding thin respective lateral edges 20c and 20d, so as to achieve the cross-sectional shape shown in FIG. 3.

Figure 2:
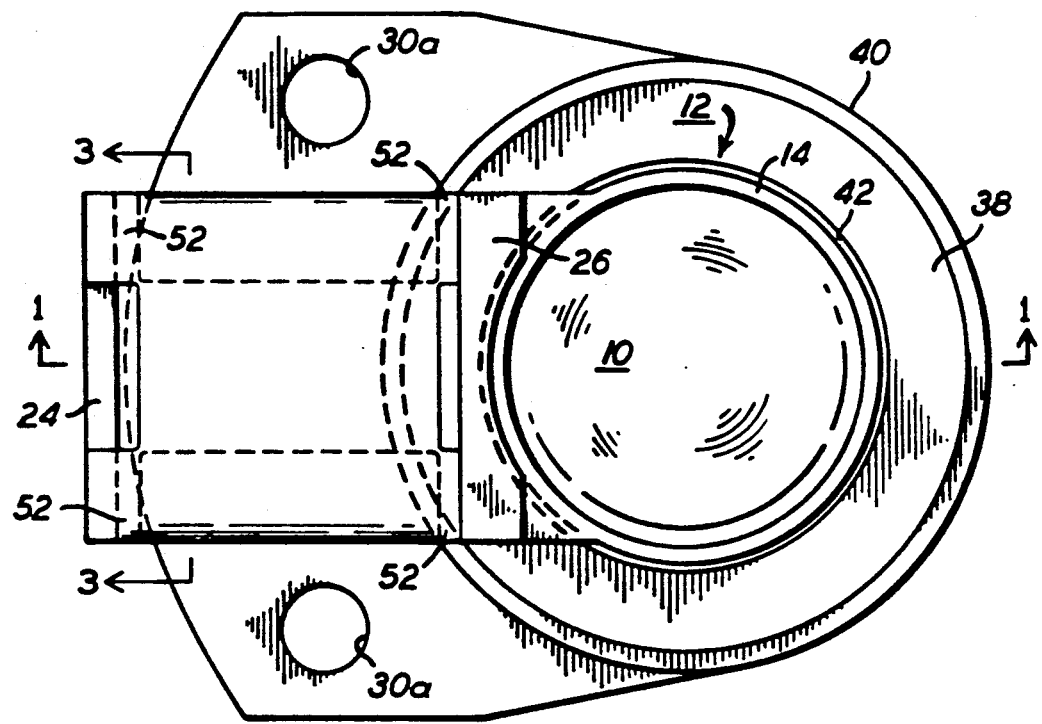
FIG. 2 is a top plan view of the FIG. 1 apparatus.

Spring support member 24 is affixed to one end of the actuator's mounting plate 30 by a pair of rigid tabs 24a and 24b which extend outwardly from the central region of member 24 and define a slot for receiving mounting plate 30 in an interference fit. Plate 30 is provided with a pair of apertures 30a for attachment, for example, to the stationary frame of an optical write-/read head. In addition to supporting the spring support member 24, mounting plate 30 also supports a pair of electro-magnetic elements 32, 34 which preferably take the form of inductance coils L1 and L2, respectively. Coils L1 and L2 are housed by a ferromagnetic shroud 38 (e.g. soft iron) comprising a coil-separating portion 38a, and top and bottom portions 38b and 38c, respectively. Shroud 38 and its contained coils L1 and L2 are supported in a collar 40 which defines a circular aperture in mounting plate 30. As shown in FIGS. 1 and 2, coils L1 and L2 are concentrically arranged with respect to the ferromagnetic cylinder 18, as well as with respect to optical axis A. A small air gap 42 is provided between the coils and ferromagnetic cylinder 18 to allow the lens assembly to move axially, parallel to the lens axis A.

In operation, radiation reflected from surface S passes through beam splitter BS to detector D. The detector is of conventional design and cooperates with a focus control circuit FC for producing a pair of focus error signals $E_S$ and $E_{S'}$ indicative of the focus position of the lens. These error signals are provided alternately, $E_S$ being applied to coil L2, and $E_{S'}$ being applied to coil L1. Coil L1 responds to error signal $E_{S'}$ to produce a magnetic field tending to advance the ferromagnetic cylinder 18 in an upward direction, thereby moving lens 10 toward surface S. Cylinder 18 moves upwardly to a position in which it provides the shortest magnetic path between the pole tips defined by the free end of the shroud top plate 18b and the free end of the separator portion 18a. Similarly, coil L2, in response to error signal $E_S$, produces a magnetic field tending to advance the ferromagnetic cylinder 18 downwardly, thereby moving lens 10 away from surface S. The soft iron shroud 38 also serves to confine the magnetic path between the coils and cylinder 18, thereby reducing stray flux. It should be noted that the operation of the FIG. 1 actuator is totally independent of the direction of coil windings or the polarity of $E_{S'}$.

The thickness of the soft iron components, i.e., cylinder 18 and shroud 38, is such as to approach saturation at the maximum flux levels. In a preferred embodiment, both cylinder 18 and shroud 38 are made from tin-plated soft iron having a thickness of about 0.134 mm. While soft iron is the preferred material, any ferromagnetic material which does not retain its magnetic properties when removed from a magnetic field (i.e., low coercivity materials) can be used.

Figure 4:
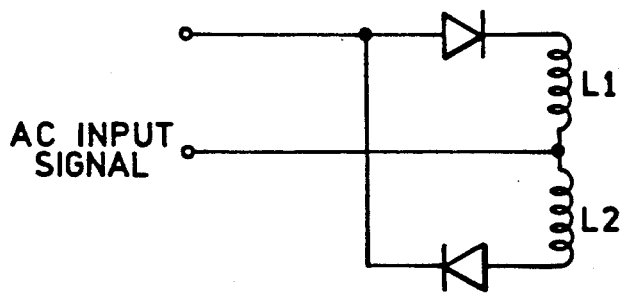
FIG. 4 is an electrical schematic of a driver circuit.

FIG. 4 shows a simplified driving circuit whereby an A.C. input control signal alternately drives coils L1 and L2, if the focus error signals happen to be of opposite polarity. For maximum efficiency, it is apparent that the duty cycle of each coil should not exceed 50%, and it can be shown that no greater temperature rise will occur if each coil occupies 70% of the volume of one coil at 100% duty cycle. In the FIG. 4 circuit, the diodes assure that each coil is receiving current during either the positive or negative portion of the A.C. cycle.

A net current in either coil will cause lens 10 to move along the lens axis in one direction or the other.

Figure 5:
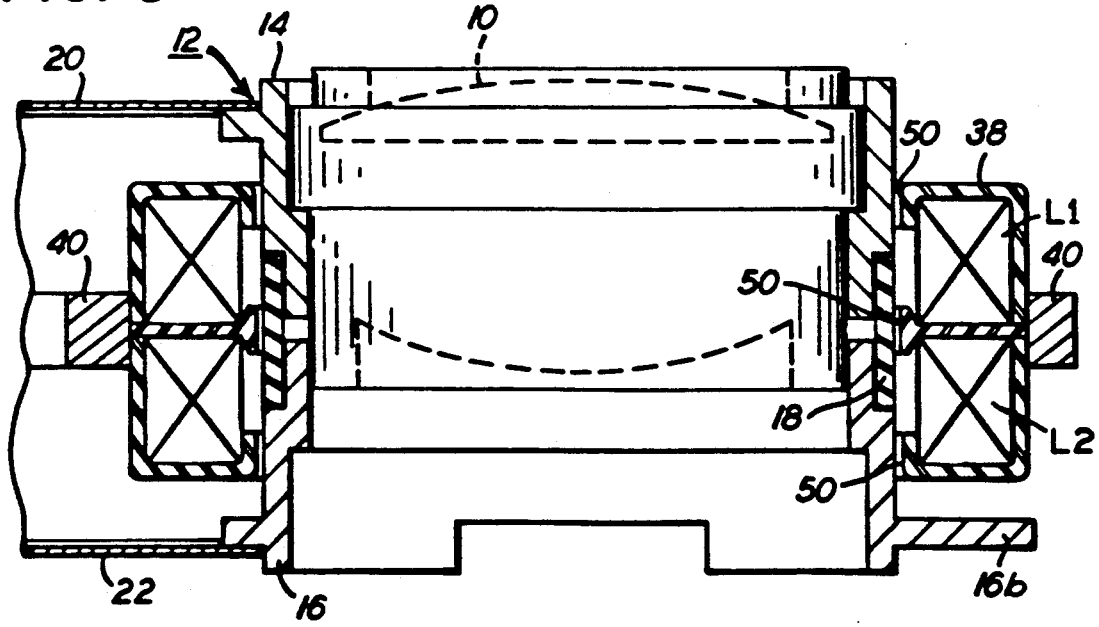
FIG. 5 is a cross-sectional view of a modified version of the FIG. 1 apparatus.

As an alternative to the design shown in FIG. 1, the ends of the shroud and its partition 38 may be swaged out to present a wider surface at the air gaps. See FIG. 5. The swaged out regions 50 serve to appreciably reduce the total magnetic reluctance and the required ampere-turns from the driver coils L1 and L2. Smaller coils can then be used and/or the operating temperature reduced.

As regards the design of the flat springs 20 and 22, it is desirable to provide the maximum column strength and maximum stiffness in the longitudinal and transverse directions for a given vertical stiffness. It has been found that this can best be accomplished using a stiff central section with concentrated flexure zones 52 at each end. FIG. 3 shows how a central stiffness is simply achieved by bending the spring stock around each lateral edge.

In view of the foregoing description, it will be appreciated that an exceptionally compact and light-weight focus actuator has been provided. In the embodiment described, the total weight of the actuator is only 1.16 grams, which includes a 100 mg. lens. The weight of the moving mass is only 265 mg., which includes the lens, lens supporting member 14, 16, ferromagnetic cylinder 18, and an optional counter weight 16b. Full travel of the lens between its top and bottom vertical positions was achieved by using a 60 cycle, 150 milliamp, input signal in the FIG. 4 circuit for life testing purposes.

The invention has been described in detail with particular reference to preferred embodiments thereof, but it will be understood that variations and modifications can be effected within the spirit and scope of the invention. For example, the concentric geometry shown in FIGS. 1 and 2, though highly preferred, is not mandatory. The lens, for example, need not be concentrically arranged within the moving cylinder 18. Rigid coupling between member 18 and lens 10 is all that is required.

I claim:

1. A focus actuator for controlling the focal position of an objective lens relative to a surface which is moving toward and away from such lens to maintain a beam of radiation passing through the lens in sharp focus on the moving surface, said focus actuator comprising:
   (a) a lens assembly unit connected to the objective lens, said lens assembly unit including a ferromagnetic member of low coercivity;
   (b) a spring assembly for connecting said lens assembly unit to a base unit of the focus actuator, said spring assembly including a first planar spring and a second planar, said first and said second planar spring spaced apart and limiting movement of said lens assembly unit to be parallel to an axis of said objective lens; and
   (c) a pair of selectively energizable inductance coils connected to said base unit and arranged side-by-side with their respective control axes being substantially parallel to the optical axis of the lens, each inductance coil being closely spaced from said ferromagnetic member and being responsive to an electrical signal to produce a magnetic field tending to cause said ferromagnetic member to move in a direction in which its coupled lens moves parallel to the optical axis of such lens, one of said inductance coils cooperating with said ferromagnetic member to advance the lens in a first direction along such optical axis independent of the direction of coil windings or the polarity of the electrical signal, the other of said inductance coils cooperating with said member to advance the lens in a second direction opposite said first direction independent of the direction of the coil windings or the polarity of the electrical signal.

2. The focus actuator as defined by claim 1 wherein each of said coils is arranged within a three-sided housing of ferromagnetic, low-coercivity material.

3. The focus actuator as defined by claim 2 wherein said inductance coils are arranged side-by-side with their respective central axes being substantially coincident and parallel to the optical axis of the lens.

4. The focus actuator as defined by claim 2 wherein said coil axes and lens axis are coincident.

5. The focus actuator as defined by claim 1 wherein said ferromagnetic member comprises a cylinder of soft iron.

6. The focus actuator as defined by claim 2 wherein said ferromagnetic cylinder, said inductance coils and said objective lens are concentrically arranged.

7. The focus actuator as defined by claim 6 wherein said inductance coils surround said ferromagnetic cylinder and said objective lens.

8. The focus actuator as defined by claim 7 wherein said housing material is soft iron.

9. The focus actuator as defined by claim 1 wherein said first and second planar springs are connected to said lens assembly unit on either side of said ferromagnetic member.

10. The focus actuator as defined by claim 1 wherein said first and said second planar springs include a structure which increases rigidity in a central portion of each of said springs.

11. The focus actuator as defined by claim 9 wherein said structure fabricated by central folded region of said planar springs.

12. The focus actuator as defined by claim 1 wherein the electrical signal applied to each of said inductance coils is selected polarity of an alternating current signal.

* * * * *